United States Patent [19]
Garcia et al.

[11] Patent Number: 5,412,985
[45] Date of Patent: May 9, 1995

[54] SYSTEM AND METHOD FOR RATIOMETRICALLY PROCESSING SENSED SPEED AND VIBRATION SIGNALS FOR A NON-UNIFORMLY ROTATING BODY

[75] Inventors: David L. Garcia, Salem, N.H.; Robert G. Bianchi, Billerica; Robert J. Hueston, Stoneham, both of Mass.

[73] Assignee: Ametek Aerospace Products, Inc., Wilmington, Mass.

[21] Appl. No.: 947,425

[22] Filed: Sep. 18, 1992

[51] Int. Cl.$^6$ .................. G01M 1/16; G06F 15/20
[52] U.S. Cl. ......................... 73/460; 364/463
[58] Field of Search ............... 73/460, 462, 660; 364/506, 508, 463

[56] References Cited
U.S. PATENT DOCUMENTS
5,089,969  2/1992  Bradshaw et al. ............... 364/463

Primary Examiner—Richard E. Chilcot, Jr.
Assistant Examiner—William L. Oen
Attorney, Agent, or Firm—Amster, Rothstein & Ebenstein

[57] ABSTRACT

A digital ratiometric tracking filter provides superior measurement of the magnitude and phase of vibration of a rotating body, at uniform or non-uniform rotational speed. The sensed speed and vibration signals are concurrently processed and subsequently combined to produce the absolute magnitude and relative phase measurements. The concurrent processing of the sensed signals assures that any system-introduced errors are found in both signals and can be uniformly eliminated by the ratiometric processing thereof.

24 Claims, 1 Drawing Sheet

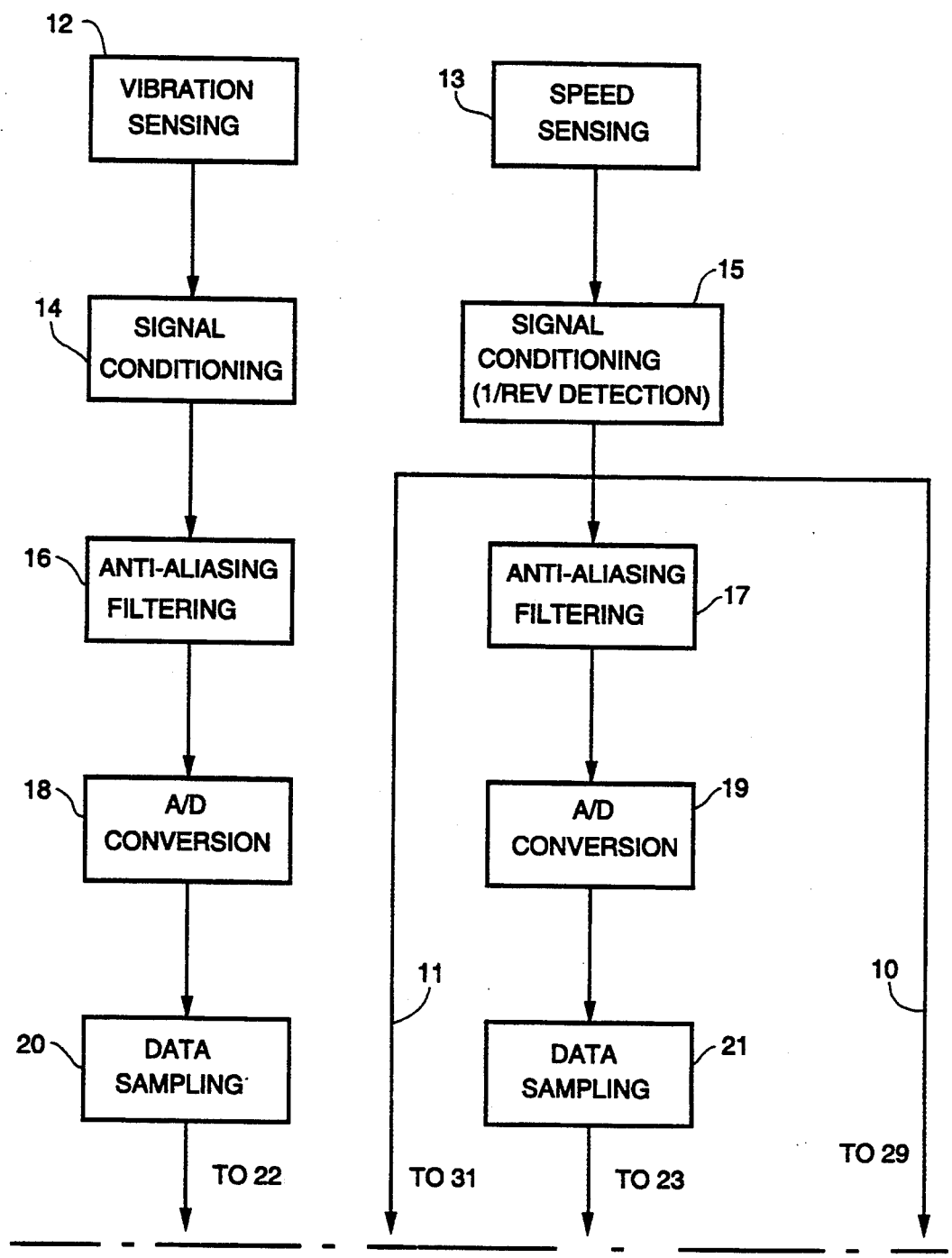

SYSTEM AND METHOD FOR RATIOMETRICALLY PROCESSING SENSED SPEED AND VIBRATION SIGNALS FOR A NON-UNIFORMLY ROTATING BODY

The present invention relates to a method and apparatus for monitoring the vibration performance of rotating or reciprocating machines. More particularly, the invention provides a system for accurately measuring the vibration amplitude and phase of rotating machines when the rotational speed is not constant.

BACKGROUND OF THE INVENTION

In order to evaluate the performance of rotating machines or parts thereof, it is desirable to represent the vibrational characteristics in terms of magnitude and phase versus frequency, otherwise known as a power spectrum. In order to produce the power spectrum of vibration-based data, uniform time interval data must be processed to convert the time-based vibration data into frequency-based data. This process is generally effective when the rotational speed is constant; though not accurate when the rotational speed is variable.

One well-known approach for obtaining and converting time-based vibration data from a fixed speed shaft to frequency-based data is to sample the time-based vibration data synchronously with the sensing of the rotational speed of the shaft. The sampling done at a fixed shaft speed provides signals useful in obtaining magnitude and phase measurements at a once-per-revolution (1/REV) frequency. However, when the shaft speed is changing during the interval for which the vibration signal is being sampled, the magnitude and phase measurements for the sampled data will be inaccurate.

The prior art utilizes three different methods for obtaining vibration measurements for variable speed shafts, namely analog tracking filters, switched capacitor tracking filters, and digital tracking filters, each of which is used in conjunction with a tachometer, for sensing speed and generating a shaft speed signal, and a vibration sensor, for sensing acceleration, velocity or displacement.

The analog tracking filter multiplies the sense vibration signal by the fundamental, 1/REV, shaft speed signal. Sum and difference frequencies result in accordance with well-known principles. The difference frequency is extracted with a low-pass filter, the output of which is further processed to produce a voltage proportional to the vibration amplitude. The low-pass filter must have a wide bandwidth to account for measurement inaccuracies due to the variability of the speed of the shaft. Therefore, the analog tracking filter method suffers from poor noise rejection due to the use of a wider than optimal pass band.

The switched capacitor tracking filter uses discrete time sampling techniques to synthesize stable high-accuracy multi-pole filters, with the cut-off frequencies being controlled by a clock. The speed sensor signal is used to generate the switched capacitor filter clock. The output of the filter is then further processed to produce voltages proportional to vibration amplitude and phase angle. The switched capacitor tracking filter technique includes filtering delays for rejecting tachometer jitter. Moreover, when the speed sweeps dynamically, mistracking of the filter results, due to time delays in responding to the speed variations. To compensate for the poor dynamic performance, the tracking filer bandwidth is increased, resulting, as with the analog tracking filter, in less noise rejection.

Finally, digital tracking filters are utilized which use digital processing techniques to implement the tracking filter through software. Digital filtering of the tachometer permits measurement by the tachometer on a 1/REV speed and removal of tachometer jitter by averaging of the tachometer frequency on a 1/REV basis. With sufficient processing capability, the cut-off frequencies of the tracking filter may be tracked to the latest speed measurement. One approach, the subject of co-pending application Ser. No. 946,913, filed simultaneously herewith, entitled "Dynamic Digital Tracking Filter" of Garcia, et al. and assigned to the present assignee, uses a Fast Fourier Transform (FFT) to estimate the vibration spectrum while associated software defines the appropriate band of frequencies based upon the speed for the measurement period. A further enhancement, order tracking, uses an integer multiple of the 1/REV sampling rate to center the 1/REV vibration signal within the tracking filter to thereby eliminate amplitude variations within the filter.

Digital tracking filters suffer from some of the same deficiencies as the two previously-discussed filters. To ensure tracking, the digital tracking filter bandwidths must be wide enough to maintain the fundamental rotor speed within the bands. Consequently, the bandwidths include energy outside of the fundamental rotor speed, thereby increasing the errors associated with unwanted vibrations. Order tracking, described above, can narrow the bandwidth, but is still susceptible to inaccuracies due to speed variations and non-synchronous tones. In all cases, the delay between measuring the speed and estimating the frequency spectrum introduces mistracking errors. Further, differences in the processing of the speed and vibration signals can introduce system errors which affect the output of the filter.

It is therefore an objective of the present invention to provide a tracking filter which overcomes the deficiencies of prior art tracking filters.

It is another objective of the invention to obtain accurate measurement of the absolute magnitude and the relative phase of vibration of a rotating structure having uniform or non-uniform rotating speed.

Yet another objective of the present invention is to produce optimum absolute magnitude and relative phase of vibration measurements for a given number of rotations of the structure or for a specific time window.

A further objective of the invention is to produce optimum relative phase and absolute magnitude measurements for a given rotational speed variation.

A still further objective is to dynamically provide the minimum tracking bandwidth for the actual speed variation.

Another objective of the invention is to provide a tracking filter which eliminates the effects of delay in estimating the frequency spectrum and further eliminates the effects of noise and of system-introduced errors.

A further objective of the invention is to provide a tracking filter which eliminates the need to perform phase correction due to the position of the 1/REV frequency within the tracking band.

SUMMARY OF THE INVENTION

These and other objectives are realized by the present invention wherein ratiometric processing techniques are used to extract the relative phase and magnitude from dynamically changing vibration and speed signals. The vibration sensor and tachometer signals are processed in the same manner, thereby introducing the same delays and attenuation into the vibration and engine speed signals. Measurement of the differences between the processed signals yields the relative phase angle of vibration. The relative magnitude of vibration is determined ratiometrically by dividing the vibration magnitude by the speed attenuation thereby producing an absolute magnitude frequency response based on the engine speed variations. The relative phase of the vibration is determined by subtracting the speed phase from the vibration phase, as detailed herein.

BRIEF DESCRIPTION OF THE DRAWINGS

The invention can best be understood by reference to the following detailed description, taken in conjunction with the accompanying drawings wherein.

DETAILED DESCRIPTION OF THE PREFERRED EMBODIMENT

Figure 1:
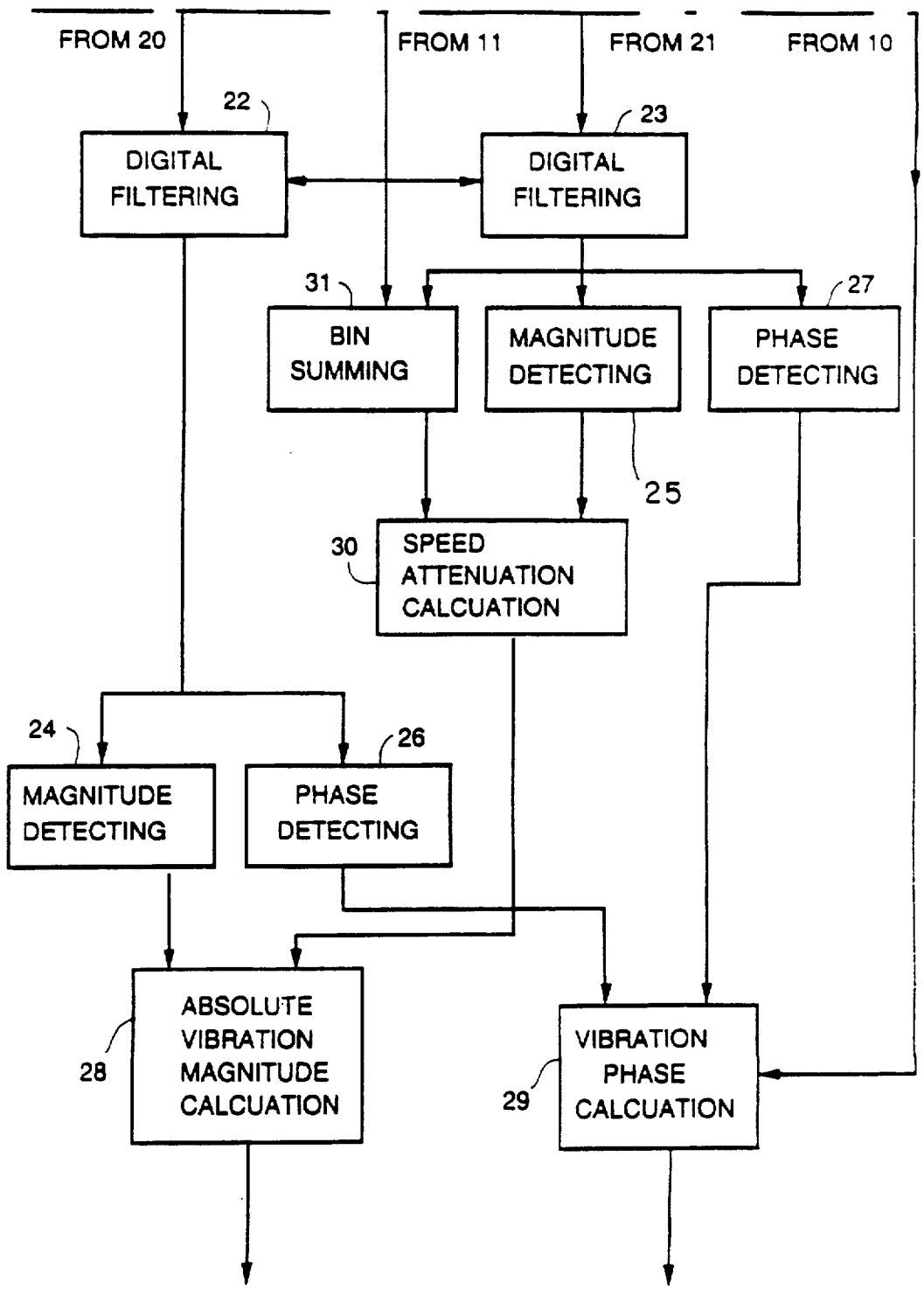
FIG. 1 details the processing flow for the present digital ratiometric vibration tracking system.

In accordance with the present invention as illustrated in FIG. 1, the vibration signals, sensed at block 12, are processed, through blocks 14, 16, 18, 20 and 22, in parallel with the processing, along blocks 15, 17, 19, 21 and 23 of the speed signals output from speed sensing block 13. The simultaneous processing effectively corrects for amplitude attenuation and phase shift introduced by the processing functions since identical processing distortions are introduced into both the speed and vibration processing paths. Unlike prior art systems, wherein the unprocessed speed measurement would be used to synchronize the sensed vibration having processing errors therein, the present system effectively cancels out processing errors by the concurrent processing of the two signals.

The signal processing steps will now be detailed with reference to FIG. 1. A vibration signal is output from the vibration sensing block 12, which sensing can be performed by an accelerometer, a velometer or a displacement sensor. As is known in the art, it is not necessary that a particular vibration sensing apparatus be utilized since, for example, acceleration data can readily be converted into velocity data depending upon the hardware and/or software which will subsequently process the signal. Signal conditioning block 14 provides conversion of sensed signals into analog voltage signals which may readily be filtered at anti-aliasing filtering block 16. In conditioning the vibration signal, the signal may be buffered by standard buffering amplifiers. If conversion of acceleration data to velocity data or velocity to displacement data is required, one or more integration steps may be included in the signal conditioning.

Anti-aliasing filtering of the conditioned vibration signal is conducted to remove unwanted high frequency signals in a step illustrated at block 16. Theoretically, one could envision practicing the present invention without anti-aliasing filtering; but, practically, the step will facilitate the subsequent processing. The anti-aliasing filtering reduces the amplitude, of frequencies in excess of the highest frequency of interest, to an amplitude below the level of noise for the system to thereby minimize degradation of the highest frequency of interest. The choice of the order and type of filter is based upon the attenuation requirement, the accuracy needs and the sample rate, all of which are well within the purview of one having skill in the art.

Concurrently with the vibration signal conditioning, the speed signal, sensed at block 13 by a tachometer, is conditioned as represented by block 15. The speed signal conditioning step converts the speed signal to a stable amplitude 1/REV signal with the frequency corresponding to the rotating machine's once per revolution (1/REV) speed. The 1/REV speed output signal is used to select the vibration bin and tachometer bins based on the variation in speed measured during the vibration and tachometer sampling. Therefore, in addition to being provided for further processing at block 17, the 1/REV output of block 15 is provided along line 11 to be used in the digital filtering steps at blocks 22 and 23. Furthermore, the 1/REV output along line 11 is provided to block 31 as discussed below and as detailed in the aforementioned, co-pending patent application, the teachings of which are hereby incorporated by reference.

Upon conditioning, the speed signal is provided for anti-aliasing filtering in the step at block 17, as above with the vibration signal. The cut-off frequency and filter type must be the same for the filter chosen for the anti-aliasing filtering of both the speed and vibration signals. Uniformity in removing the high frequencies is required for future processing of both signals, although a single anti-aliasing filter could not be used to filter the vibration and speed signals at this juncture of the processing.

The remainder of the processing steps, however, can be performed on both the speed and the vibration signals by "shared" components performing the processing steps on each of the signals. For clarity purposes, the steps are set forth as being performed independently upon each of the speed or the vibration signals to clearly delineate what is being done to each signal. As will be apparent to one having skill in the art, one component can conduct its processing function on both the speed and the vibration signal; and may, in fact, be capable of performing a number of the subsequently detailed steps on each signal.

After being output from the anti-aliasing filtering steps, the vibration and speed signals are both provided for analog-to-digital (A/D) conversion, blocks 18 and 19 respectively, at one or two A/D converters. The A/D conversion concurrently converts the analog signals from the vibration and speed channel into digital data at a specified sample rate. The digital output of the conversion is subsequently used to determine the vibration magnitude and phase angle.

The specified A/D sample rate is chosen based upon the highest frequency of interest and the roll-off characteristics of the anti-aliasing filters used, as will be evident to one having skill in the art. The advantage of using a single A/D converter for steps 18 and 19 is that errors introduced in the conversion steps will be introduced identically into both the vibration and speed signals and therefore proportionately "removed" therefrom in the subsequent ratiometric processing.

The next process step, labelled "Data Sampling" at steps 20 and 21, collects and windows a set of vibration samples and speed samples acquired over a fixed time period for further processing. The data sampling function can be performed by a single processing means, as was the case with the A/D conversion, with any introduced errors being equally introduced and readily removed. The inventive system does not require a specific sample set size to function. Generally, the elapsed time of the sample set establishes a limit to the resolution for the filter, with a longer elapsed time resulting in better resolution for the filter. Conventional processing techniques have difficulty achieving better resolution in the presence of varying speeds, in contrast to the present system.

Once the sample data set has been defined for each signal, the sampled vibration and speed signals are provided for digital filtering at blocks 22 and 23. The digital filtering function provides filtering through a pass band centered around the 1/REV speed frequency supplied along line 11. The resolution (i.e., bandwidth) of the filter is dependent upon the window and the sample time. The digital filter may be implemented as a Finite Impulse Response (FIR) filter, Infinite Impulse Response (IIR) filter, or selected from any spectral estimation technique such as Fast Fourier Transform (FFT). The type of digital filter used is not critical, nor is it, once again, critical if one or two filters perform the digital filtering steps at 22 and 23. What is imperative is that identical processing be performed on both the vibration and the speed signals, so that any filter errors that might attenuate the amplitude or shift the phase will be introduced into both signals and removed by the subsequent ratiometric processing.

The magnitude detection steps, at blocks 24 and 25, involve determining the magnitude of the vibration and speed filtered by the digital filtering steps. The magnitude can be determined by a number of techniques. When using FIR or IIR filters, the filtered vibration and speed must be integrated over the sample time, while an FFT filter provides the magnitude directly by selecting the appropriate FFT band that corresponds to the 1/REV speed. The FFT has the advantage of providing the amplitude of both the vibration and the speed signals as a function of frequency. The vibration magnitude and speed attenuation outputs are provided for the absolute vibration magnitude calculation step at block 28. The absolute magnitude is obtained by dividing the vibration magnitude in the band output from step 24 by the output of the speed attenuation block 30 in the same band. The speed attenuation is calculated at step 30 by dividing the output of block 25 by the output of Bin Summing block 31. The output of block 31, the 1/REV speed magnitude, may be determined by a number of methods; one example being that, when the wave shape is not known, the 1/REV speed magnitude can be measured with FFT by summing the bands near the 1/REV speed signal, as detailed in the aforementioned co-pending patent application. The output of block 31 may be a fixed value predetermined by the system design. If the 1/REV speed magnitude is fixed, no bin summing is done at block 31.

The phase detection function at 26 and 27 determines the relative phase between the vibration and speed signals filtered by the digital filtering steps 22 and 23. The phase angle can be determined by any number of techniques. For FIR or IIR filters, the digitally filtered vibration and speed outputs may be scanned and the time difference between the vibration and speed signal zero-crossings averaged to determine the phase shift. For FFT's, this is provided directly by selecting the appropriate FFT band for the vibration and speed signals and then performing a cross-spectrum.

The FFT has the advantage of providing the phase of both the vibration and the speed signals as a function of frequency. Since the FFT provides a phase angle referenced to the start of sampling and the present system samples the vibration and speed data with a fixed time difference, it is not necessary to synchronize the FFT to the speed signal or any other reference point. This allows the present system to continuously provide magnitude and phase angle without regard to synchronization. More importantly, no error is introduced due to synchronization.

The present digital ratiometric vibration tracking system calculates the vibration relative phase angle at block 29 by subtracting the speed phase from the vibration phase. Since windowing introduces bleeding into adjacent bins, the corresponding phase shift introduced by the FFT window associated with the adjacent bins is equivalent to the phase shift experienced by the 1/REV adjacent bins with the difference equal to the relative phase angle measured by the closest bin. As a result, an area of constant relative phase is established by a single 1/REV tone. This relationship holds regardless of where the 1/REV tone is located.

Calculating the difference between the vibration phase angle and the speed phase angle may be accomplished by calculating the angle associated with each FFT and subtracting the result. Since the FFT provides results in terms of complex numbers, complex math may be employed to subtract the phase angles. Complex math allows the relative phase angle to be calculated by multiplying the vibration complex number by the complex conjugate of the speed complex number (i.e. complement of the imaginary component) and then performing the arc tangent of the imaginary component divided by the real component of the resulting complex number. This approach is defined as the cross-spectrum and requires less math than calculating the phase angle of each FFT and subtracting the angles calculated for the corresponding FFT bin. If the speed signal is not 50% duty cycle then an additional phase correction factor can be calculated from the known duty cycle to adjust the final phase result. If the speed signal is not constant duty-cycle, then an additional phase correction factor can be calculated from the known speed and used to adjust the final phase result. The additional phase correction factor is referenced to the center of the 1/REV pulse, as provided along line 10.

The present system does not require any particular method to calculate the difference between vibration and speed phase angles. The cross-spectrum simply provides an efficient means of doing so.

Although the present invention has been shown and described with respect to preferred embodiments, various changes and modifications which are obvious to persons skilled in the art are deemed to lie within the spirit and scope of the invention as set forth in the appended claims.

What is claimed is:

1. A method for characterizing the vibration of a rotating body comprising the steps of:
   monitoring vibration signals during a measurement period;
   asynchronously monitoring rotational speed signals during said measurement period, simultaneously with said monitoring of vibration signals;
   concurrently processing said simultaneously monitored vibration and speed signals; and
   ratiometrically combining said vibration and speed signals to yield the absolute magnitude and relative phase of vibration of said body.

2. The method of claim 1 wherein said processing comprises detecting the magnitude and phase of each of said vibration and speed signals and wherein said combining step comprises combining the magnitudes of said vibration and speed signals to yield the absolute magnitude of vibration of the body and combining the phase of said vibration and speed signals to yield the relative phases of vibration of said body.

3. The method of claim 2 wherein said detecting of the magnitude of the speed signal further comprises detecting the attenuation of said magnitude at at the fundamental frequency of rotation.

4. The method of claim 3 wherein said combining of magnitudes comprises dividing the magnitude of the vibration signal by the attenuation of the magnitude of said speed signal.

5. The method of claim 2 wherein said combining of phase angles comprises subtracting said phase of said speed signal from the phase of said vibration signal.

6. The method of claim 2 wherein said processing further comprises the step of converting said vibration and speed signals to digital signals.

7. The method of claim 2 wherein said processing further comprises the step of filtering said vibration and said speed signals prior to detecting said magnitudes.

8. The method of claim 2 wherein said processing further comprises conditioning said vibration signal by converting said vibration signals into analog voltage signals.

9. The method of claim 2 wherein said processing of said speed signal comprises converting said speed signal from a time-based signal to a frequency-based speed signal which corresponds to the rotational speed of the rotating body.

10. A method for characterizing the magnitude and relative phase of vibration of a rotating body comprising the steps of:

sensing vibration signals during a measurement period;

asynchronously sensing rotational speed signals during said measurement period simultaneously with said sensing vibration signal; and concurrently processing said vibration signals and said rotational speed signals, wherein said concurrent processing comprises converting said sensed vibration signals into analog vibration voltage signals;

converting said speed signals from time-based signals to frequency based speed signals;

effecting conversion of said analog vibration voltage signals and said frequency-based speed signals from analog to digital vibration and speed signals;

filtering said digital vibration and speed signals;

detecting the magnitudes of said digital vibration and speed signals;

detecting the phases of said digital vibration and speed signals;

combining said magnitudes of said digital vibration and speed signals to obtain the proportional magnitude of vibration of said rotating body; and combining said phases of said digital vibration and speed signals to obtain the relative phase of vibration of said rotating body.

11. The method for claim 10 further comprising anti-aliasing filtering of said analog vibration voltage signals and said frequency-based speed signals.

12. The method of claim 10 further comprising selecting sets of said digital vibration and speed signals for a predetermined time period and wherein only said sets of said digital vibration and speed signals are subsequently filtered.

13. The method of claim 10 further comprising obtaining the speed attentuation by dividing the magnitude of the speed signal by the speed magnitude and wherein said combining of said magnitude comprises dividing the magnitude of said vibration signal by the speed attenuation to yield the absolute magnitude of vibration.

14. The method of claim 10 wherein said combining of phases comprises subtracting the phase of said speed signal from the phase of said vibration signal.

15. The method of claim 10 wherein said combining of phases comprises performing a cross-spectrum calculation.

16. A tracking filter system for providing the amplitude and phase of vibration of a rotating body, when the rotational rate is uniform or non-uniform comprising:

a first sensor for producing vibration signals;

a second sensor for producing first speed signals;

means for converting said vibration signals into vibration frequency signals;

means for converting said first speed signals into frequency-based second speed signals;

means responsive to said first speed signals for determining the magnitude of said vibration frequency signals and second speed signals;

means for determining the phases of said vibration frequency signals and said second speed signals;

means for combining said magnitudes to produce the magnitude of vibration of said rotating body; and means for combining said phases to produce the phase of vibration of said rotating body.

17. The system of claim 16 further comprising means for converting said vibration frequency signals land said second speed signals into digital vibration and speed signals.

18. The system of claim 17 wherein said means for determining the magnitudes further comprises digital filter means.

19. The system of claim 18 wherein said means for determining the phases further comprises digital filter means.

20. The system of claim 16 wherein said first sensor is an accelerometer.

21. The system of claim 16 wherein said first sensor is a velometer.

22. The system of claim 16 wherein said first sensor is a displacement sensor.

23. The system of claim 16 wherein said second sensor means is a tachometer.

24. The system of claim 16 further comprising anti-aliasing filter means associated with each of said means for converting said vibration signals and means for converting said first speed signals.

* * * * *

UNITED STATES PATENT AND TRADEMARK OFFICE
CERTIFICATE OF CORRECTION

PATENT NO. : 5,412,985
DATED : May 9, 1995
INVENTOR(S) : Garcia et al.

It is certified that error appears in the above-indentified patent and that said Letters Patent is hereby corrected as shown below:

The sheet of drawing containing FIG. 1 (Continued) should be added as per attached page.

Signed and Sealed this

Twenty-fourth Day of October, 1995

Attest:

BRUCE LEHMAN

Attesting Officer

Commissioner of Patents and Trademarks